(12) United States Patent
Maes

(10) Patent No.: US 8,589,340 B2
(45) Date of Patent: Nov. 19, 2013

(54) DATA SYNCHRONIZATION VIA THREE OR MORE PATHS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 293 days.

(21) Appl. No.: 11/329,862

(22) Filed: Jan. 10, 2006

(65) Prior Publication Data

US 2007/0179989 A1 Aug. 2, 2007

(51) Int. Cl.
*G06F 17/30* (2006.01)

(52) U.S. Cl.
USPC .................. 707/610; 707/617; 707/620

(58) Field of Classification Search
USPC ............... 707/201, 610, 617, 620
See application file for complete search history.

(56) References Cited

U.S. PATENT DOCUMENTS

| | | | |
|---|---|---|---|
| 6,341,316 B1* | 1/2002 | Kloba et al. | 709/248 |
| 6,779,019 B1* | 8/2004 | Mousseau et al. | 709/206 |
| 6,820,088 B1* | 11/2004 | Hind et al. | 707/101 |
| 7,215,258 B2* | 5/2007 | Wormald | 341/23 |
| 7,870,412 B2* | 1/2011 | Maes | 713/400 |
| 2005/0010583 A1* | 1/2005 | Clifton-Bligh | 707/100 |
| 2006/0106881 A1* | 5/2006 | Leung et al. | 707/200 |
| 2006/0174017 A1* | 8/2006 | Robertson | 709/229 |
| 2006/0230057 A1* | 10/2006 | Kosov et al. | 707/102 |
| 2007/0073899 A1* | 3/2007 | Judge et al. | 709/246 |
| 2007/0100834 A1* | 5/2007 | Landry et al. | 707/10 |

* cited by examiner

*Primary Examiner* — Mahesh Dwivedi
(74) *Attorney, Agent, or Firm* — Kilpatrick Townsend & Stockton LLP

(57) ABSTRACT

A server is used to send data records to clients. A client #1 may synchronize with the server using a first path and a first protocol. The client #2 may synchronize with the server using a second path and a second protocol. In addition to synchronizing with the server, client #1 and client #2 may synchronize data records with each other using a third path and a third protocol. When synchronizing through different paths and/or protocols, data record identifiers may be generated differently. Thus, devices may not be able to synchronize data records if the data records are identified differently by client #1, client #2, and/or the server. A universal identity is used to allow for synchronization through three paths and protocols. Thus, client #1 and client #2 may synchronize data records through the third path and third protocol using the universal identity for data records.

25 Claims, 5 Drawing Sheets

DATA SYNCHRONIZATION VIA THREE OR MORE PATHS

BACKGROUND OF THE INVENTION

Embodiments of the present invention generally relate to telecommunications and more specifically to synchronizing information among three or more devices through three or more paths.

The user may have multiple devices that are used to perform tasks. For example, the user may use multiple devices in order to send/receive emails or manage calendar and address book. A personal computer, such as a desktop or laptop computer, may be used to send/receive emails in addition to a smaller mobile device, such as a personal digital assistant (PDA), mobile telephone (e.g., cellular telephone), blackberry device, etc. A user would like to use all these devices at different times. If messages/data records between all the devices are not synchronized, a user may not have an up to date view of data records on some devices.

If the user has a desktop/laptop computer and a mobile device, both devices may synchronize with a server or backend device. The desktop/laptop and mobile device each synchronize separately with the server. Other methods of synchronization may also be provided. For example, a desktop redirector found in the desktop/laptop may be used to redirect email data records to the mobile device or synchronize PIM. For example, an email message is received at the desktop redirector and stored in the desktop/laptop computer. The redirector then sends the email message to the mobile device. Thus, the mobile device and desktop/laptop computers are synchronized.

There may be cases where the mobile device and desktop/laptop computer may not be able to connect to synchronize with the server or desktop redirector. For example, if the mobile device is taken to an area where wireless coverage is not available, then the mobile device cannot be synchronized using the server and/or the desktop redirector. This is because the server and desktop redirector depend on the mobile device to have an active connection to the wireless network through which the email messages are sent. Thus, the devices may lose synchronization.

Also, there may be cases where one of the laptop or the desktop may be more recently connected to the server than the other and there is interest to update the other with the latest information. Also, information may be changed on one of the laptop or desktop and it is desirable that these changes are reflected in the other device. However, it may not always be convenient to connect back to the server, and thus the changes may not be immediately synchronized.

BRIEF SUMMARY OF THE INVENTION

Embodiments of the present invention generally relate to synchronizing three or more devices using three or more paths.

In one embodiment, a server is used to send messages to clients. In one embodiment, a client #1 may synchronize with the server using a first path and a first protocol. The client #2 may synchronize with the server using a second path and a second protocol. Client #1 and client #2 are configured to store data records received from the server.

In addition to synchronizing with the server, client #1 and client #2 may synchronize data records with each other using a third path and a third protocol. When synchronizing through different paths and/or protocols, data record identifiers may be generated differently. Thus, devices may not be able to synchronize data records if the data records are identified differently by client #1, client #2, and/or the server. Embodiments of the present invention use a universal identity to allow for synchronization through three paths and protocols.

If client #1 separately synchronizes with the server and client #2 separately synchronizes with the server, embodiments of the present invention provide a universal identity for a data record to be generated for the same data record synchronized with client #1 and the server or with client #2 and the server. Thus, client #1 and client #2 may synchronize data record through the third path and third protocol using the universal identity for data records. If the data record identifiers were different, clients #1 and #2 may not be able to determine which data records are the same.

In one embodiment, a method for synchronizing through three or more paths is provided. The method comprises: synchronizing, from a first device, a first data record to a second device through a first path using a first protocol, wherein first data record is assigned a first universal identity; synchronizing, from the first device, a second data record to a third device through a second path using a second protocol, wherein the second data record is assigned a second universal identity; and synchronizing the second device and the third device through a third path using a third protocol, wherein synchronizing comprises using the first universal identity associated with the first data record and the second universal identity associated with the second data record to determine if the data records are the same data record.

In another embodiment, a system for synchronizing through three or more paths is provided. The system comprises: a first device; a second device configured to synchronize with the first device through a first path and first protocol, the second device configured to store data records received from the first device; and a third device configured to synchronize with the first device through a second path and second protocol, the second device configured to store data records received from the first device, wherein the second device and the third device are configured to synchronize stored data records through a third path and a third protocol, wherein a first universal identity is used for a first data record and a second universal identity is used for a second data record such that it can be determined during the synchronization between the second device and the third device if the first data record is the same data record as the second data record.

A further understanding of the nature and the advantages of the inventions disclosed herein may be realized by reference of the remaining portions of the specification and the attached drawings.

DETAILED DESCRIPTION OF THE INVENTION

Figure 1:
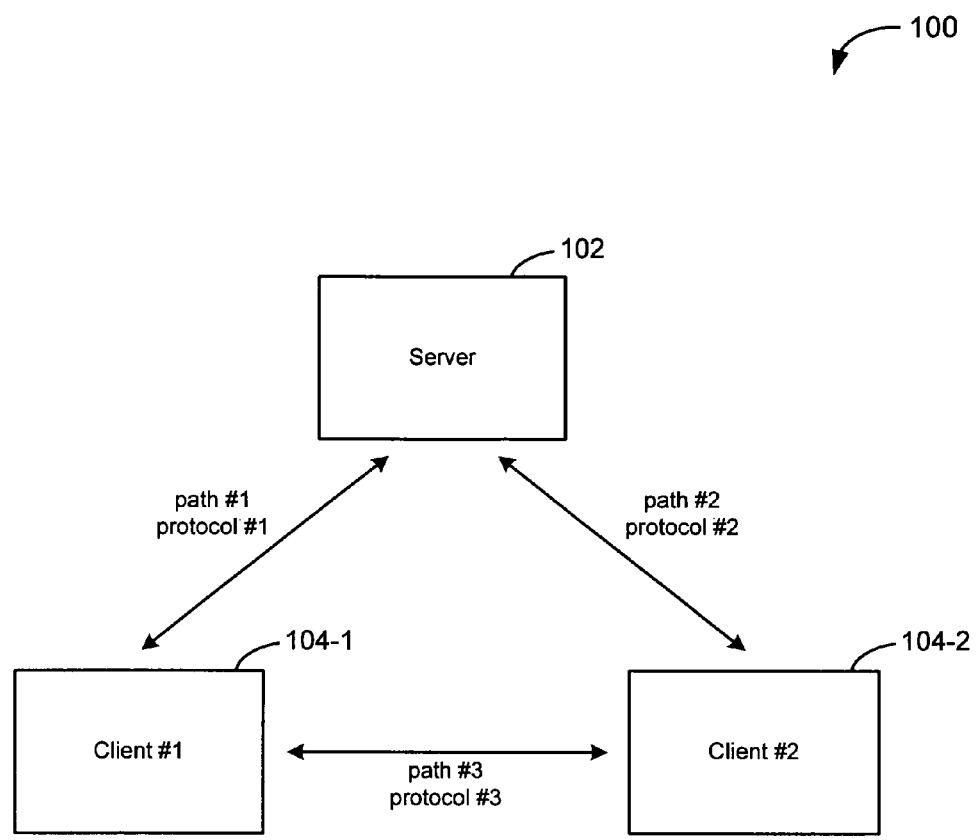
FIG. 1 depicts a system for synchronization of data records according to one embodiment of the present invention.

FIG. 1 depicts a system 100 for synchronization of data records according to one embodiment of the present invention. As shown, system 100 includes a server 102, a client 104-1 and a client 104-2. Although two clients 104 and a server 102 are shown, it will be recognized that any number of clients 104 and servers 102 may be provided. For example, two servers and one client may be used, all servers 102, all clients 104, etc. Clients 104-1 and 104-2 may be synchronized peer to peer. Also, clients 104 may be considered servers in a synchronization and servers considered clients; there is no restriction as to which devices may be synchronized. Accordingly, this includes also peer to peer synchronization. Both sides may play a role of master and slave, or peers to peer.

Server 102 is any device configured to synchronize data record with other devices. For example, server 102 may be an email/message server. Server 102 may receive data records destined for client 104-1 or client 104-2 and send them to client 104-1 or client 104-2. Additionally, server 102 may receive data records sent from clients 104 and to route them accordingly. (i.e. for email/messages it sends them, for other data record, it may have to perform actions on or with the records received from the clients).

The data records for clients 104 may be stored and maintained by server 102. Thus, server 102 may maintain a common repository of data records used for synchronization with different repositories of clients 104. For example, a client 104 may have various folders that store messages, such as an inbox folder, sent messages folder, etc. Server 102 may store the messages that are being kept in the folders. A person of skill in the art will appreciate other features of server 102.

Clients 104 may be any devices configured to store data records. Also, clients 104 may send and receive data records. Clients 104 may include a personal digital assistant (PDA), a laptop computer, a desktop computer, cellular telephone, any mobile devices, a Blackberry device, etc. Clients 104 may store data records received from server 102. Clients 104 may also be used to compose messages/data records that may be sent to server 102 for sending or other actions.

As used, data records may be any kind of information. For example, a data record is an email message. Other data records may be contemplated, such as calendar record, address book record, word processing documents, spreadsheets, or any other discreet pieces of information.

Client 104-1 may synchronize data records with server 102 using a protocol #1 and through a path #1. Client 104-2 may also synchronize data records with server 102 using a protocol #2 and a path #2. Client 104-1 and 104-2 may also synchronize using a protocol #3 and through a path #3.

A path may be any communication link. Paths may be understood as different mechanisms. They may be the same transport/network or include different networks/transport. They may also use different or the same protocols. The path may be wireless or wired path. The protocol may be any protocol that is used to send data records through the path. For example, client 104-1 may be a laptop computer and path #1 and protocol #1 may be through the Internet using an Internet Message Access Protocol (IMAP) or other email protocol. Client 104-2 may be a mobile device that may synchronize with server 102 using a second path, such as a wireless path, using a second protocol, such as a wireless email protocol.

Protocols #1, #2, and #3 may be the same or different protocol. In one embodiment, protocol #1 may be an email protocol, such as open mobile alliance OMA DS, IMAP, or other email protocols like IMAP, POP3, WebDAv, Lemonade, etc. Protocol #2 may also be an email protocol, and protocol #3 may be a real-time or peer-to-peer synchronization protocol, such as an OMA DS, or proprietary schemes like HotSync®, ActiveSync®, etc. Other variations in protocols and paths will be appreciated and it will be recognized that any of protocols #1, #2, #3 may be the same or different.

Client 104-1 may also synchronize data records with client 104-2 through a third path using a third protocol. For example, a mobile device may synchronize with a laptop. The path may be through a direct-wired connection using a proprietary protocol (e.g. serial, USB, parallel, etc.) or through a wireless connection (e.g. IRDA, Bluetooth® (a registered trademark of Bluetooth SIG (Special Interest Group), Inc., WiFi, etc.)

During synchronization, client 104 and server 102 exchange information that each already has. For example, if a first set of data records is found on a client, and a second set of data records is found on client 104-2, these data records may be synchronized such that they are the same. In one embodiment, one device may be the master and one device may be the slave such that the master is expected to be the main source and the slave will synchronize its data records to be the same as what is on the master. Also, communications may be peer to peer where parties are considered clients in the synchronization.

Client 104-1 can switch back and forth (depending on what connectivity is available) from synchronizing with server 102 and/or client 104-2. Data record identifiers are identifiers that used by protocols to identify data records. These identifiers may be created differently depending on the protocol or the devices that are involved in the synchronization.

For example, certain protocols may generate identifiers differently (e.g. generated by client or by server). Further, the same protocol may generate different data record identifiers for the same data record when different clients 104 are used (or even these data record identifiers may change from one time to another). In one embodiment, when different protocols are used, data records may be created with different data record identifiers on clients 104-2 and/or server 102.

For example, if a first protocol is used to synchronize data records between server 102 and client 104-1, a first set of data record identifiers for the data records is created. These data record identifiers are used to identify data records for server 102 and client 104-1. In one embodiment, client 104-1 may be the device that creates the data record identifiers for the data records. Client 104-2 may also synchronize the same data records with server 102. However, client 104-2 may create different identifiers for the data records. This may be because the protocol specifies that the client generates the data record identifiers. This may be the case even if the same protocol is used to synchronize between both clients and the server because the clients generate different data record identifiers.

Further, if data record identifiers using the synchronization are selected and maintained by a client 104 (e.g., if OMA DS is used), then the client creates the data record identifiers. As a result, client 104-1 and client 104-2 may have different data record identifiers for the same data record. Thus, they cannot compare them for synchronization using a third path in protocol #3. As a result, client 104-1 and client 104-2 may have different data record identifiers for the same data record. Thus, they cannot compare them for synchronization using a third path and a protocol #3.

Problems may occur even when data record identifiers are initially generated as being the same between client 104-1 and client 104-2. For example, when protocol #3 is used, the identifiers may be reset on the client 104 that plays the role of the server if protocol #3 specifies the server 102 sets the data record identifier. In this case, if client 104-2 is playing the role of the server (i.e., the master) in the synchronization, then the data record identifiers may be reset by client 104-2. This may cause the data record identifiers to change. Thus, synchronization may not be possible using the data record identifiers. Also, even if the synchronization is peer to peer, identifiers may be modified as a result.

In order to allow synchronization between a client 104 and a server 102, and between clients 104, a universal identity may be used in one embodiment. A universal identity allows clients 104 to identify data records that are the same.

The universal identity may be any information that allows data records stored on different clients 102 or servers 104 to be identified as the same data record. For example, if a protocol allows a stable common data record identifier for all data records stored on clients 104 or servers 102, then the data record identifier may be used as the universal identity.

If the data record identifier is not stable, other methods may be used to determine a universal identity. For example, a mapping between different data record identifiers for the same data record being stored on different clients 104 and servers 102 may be used. If a data record is synchronized between server 102 and client 104-1, and the same data record is synchronized between server 102 and client 104-2 where both data records have different data record identifiers, then server 102 may create a mapping between the two data record with different identifiers (e.g. Record #1 in client 104A maps to Universal identity #Z and Record #Alpha in client 104B maps to Universal identity #Z). This mapping may indicate that the data record found on client 104-1 corresponds to the same data record found on client 104-2. The mapping may be maintained on server 102. Also, the mapping may be added to each data record that is being stored on clients 104-1 and 104-2. For example, the mapping may be added to a header of each data record or any mechanism to attach or associate meta data may be used. This meta data approach is in particular easily used to attach the universal ID or mapping information to each record as part of the record or as associated meta data storable by client 104 and server 102 and synchronizable (even if not understood) by the synchronization protocol.

Also, the universal identity may be built into the data record identifier. For example, each data record may be provided with a stable and fixed universal identity as part of a data record (e.g., a date/time of creation in a server database along with the identifier as created by server 102 or client 104). This information may be added to fields of a data record. When synchronizing between client 104-1 and client 104-2, the universal identity provided in a field of the data record may be used by protocol #3 to identify the same data records. Additionally, each time a synchronization occurs, data record identifiers are re-assigned on both sides.

In another embodiment, the protocol may be changed or designed to force data records synchronized between clients and servers to have the same universal identity.

By allowing data records to be identified on both clients 104, they are able to synchronize through a third path using the third protocol. The synchronization may occur using a single repository. For example, in email, an inbox of messages is synchronized between both clients. Conventionally, separate repositories were used for each synchronization path. For example, client 104-1 kept a separate directory for path #1 and a separate directory for path #3. In this case, client 104-1 may maintain a directory for data records synchronized with server 102 and a separate directory with client 104-2 for synchronizing with that client. This is because there was no way to identify the same data records that were synchronized using different paths. However, using embodiments of the present invention, the same repository may be used.

Further, if protocol #1 relies on the data record identifier created by the server and protocol #2 relies on the data record identifier created by the client 104, protocol #3 cannot compare the data record identifiers on the clients 104. This is because the identifier created by the server 102 is different from an identifier created the client 104 in some cases. Thus, when clients 104 synchronize, the data record s being maintained on each client 104 are identified differently. Using embodiments of the present invention it is possible to address these issues by referring to the universal identity.

After synchronization between client 104-1 and client 104-2 through path #3 and protocol #3, the changes may be synchronized with server 102. This may be done the next time client 104-1 or client 104-2 connects through path #1 or path #2. After synchronizing between clients 104, the changes are not synchronized again by both clients with server 102 again. For example, if client 104-1 synchronizes with client 104-2 acting as a server, client 104-2 may synchronize the changes with the server 102. Client 104-1 does not need to synchronize those changes again with server 102 through path #1. Also, functions performed by a server may be performed during a synchronization between clients 104. For example, emails composed on a client 104-1 may be sent (e.g. submit/esmtp to a MTA) to its recipient(s) by another client 104-2. This avoids also sending multiple copies when each client synchronizes (i.e. avoid repeated actions).

Figure 2:
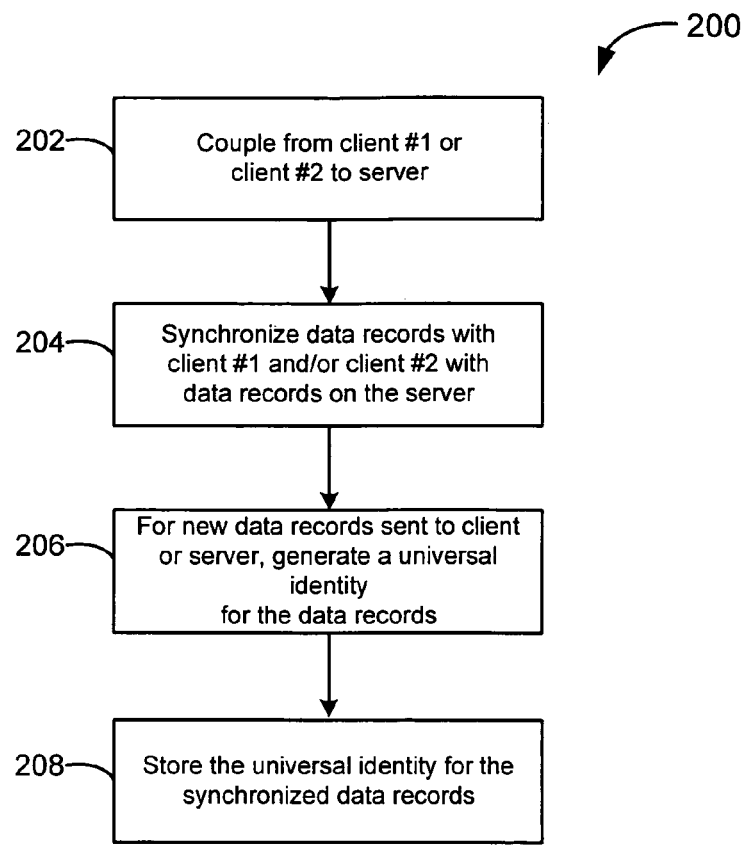
FIG. 2 depicts a simplified flowchart of a method of synchronizing data records according to one embodiment of the present invention.

FIG. 2 depicts a simplified flowchart 200 of a method of synchronizing data records according to one embodiment of the present invention. In step 202, client 104-1 is coupled to server 102. For discussion purposes, it is assumed that client 104-2 is coupled to server 102; however, it will be understood that client 104-1 may also be coupled to server 102. Client 104-2 may be coupled to server 102 using any communication medium. For example, client 104-2 may be coupled through the Internet, wirelessly (e.g. GPRS, CDMA, UMTS, WiFi, etc.), etc.

In step 204, data records on client 104-2 are synchronized with data records on server 102. For example, any changes that were made to data records stored on server 102 or client 104-2 are reflected in client 104-2 and server 102. Also, when client 104-2 and server 102 sync both changes that have taken place in client 104-2 and server 102 are respectively reflected. Conflicts may exist in that information on server 102 and client 104-2 may conflict (e.g., a data record has been changed differently on both the server and client). There may be rules for conflict situation (e.g. server wins or client wins or user decides). Data records that have been deleted from client 104-2, data records may have been received at server 102, etc. may be synchronized. The synchronization may be based on mappings or universal IDs.

In step 206, universal identities for the data records are generated for new data records (that were composed or drafted on the client). The universal identities may be a unique identity that may be the same no matter which clients 104 and servers 102 are used to create universal identities. Or, the universal identities may be a mapping between data records where data record identifiers are different depending on which clients 104 and servers 102 are used to create the data record identifiers. For example, the mapping may indicate if a first data record ID is equal to a second data record ID for the same data record found on clients 104-1 and 104-2. If the data record has not been synchronized with client 104-1 yet, the mapping identifier may not be generated as of yet. However, when a new data record is synchronized between server 102 and client 104-1, the mapping identifier is generated such that the data record found on client 104-1 is identified as being the same as a data record found on client 104-2. Server 102 may generate the mapping and synchronize it with client 104-1 and client 104-2 (e.g. by sending identifiers and mappings to clients 104).

In step 208, the universal identity is stored such that it can be used when synchronizing between client 104-1 and client 104-2. This mapping may be embedded in the data record, such as in a header of the data record.

Figure 3:
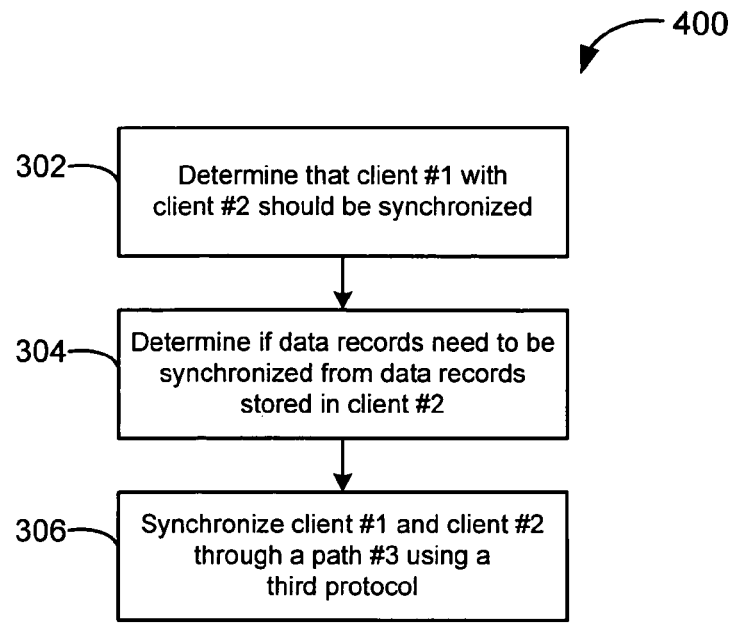
FIG. 3 depicts a simplified flowchart of a method for synchronizing clients according to one embodiment of the present invention.

After synchronizing through path #2, client 104-1 may desire to synchronize with client 104-2 through path #3. FIG. 3 depicts a simplified flowchart 300 of a method for synchronizing client 104-1 and client 104-2 according to one embodiment of the present invention. Synchronization in FIG. 3 may be performed based on the mapping or the universal ID.

In step 302, it is determined that client 104-1 and 104-2 should be synchronized (i.e. there are changes on 104-1 to be reflected on 104-1 or reciprocally). An input may be received that indicates client 104-1 and client 104-2 should be synchronized. The input may be received by selecting a synchronization input on an interface. Also, the determination may be determined automatically. For example, clients 104-1 and 104-2 may be automatically synchronized. In one example, upon a coupling (e.g., either through a wireless or wired coupling), the clients 104 are synchronized. Also, when clients 104 are within a certain range of each other or connected to a network, they may be synchronized.

In step 304, it is determined if data records need to be synchronized for client 104-2. In this determination, universal identities may be compared to determine if synchronization of any data records is necessary.

In step 306, data records are synchronized between client 104-1 and client 104-2 through a path #3 using a third protocol. This is possible because the same data records are identified using the universal identity.

Figure 4:
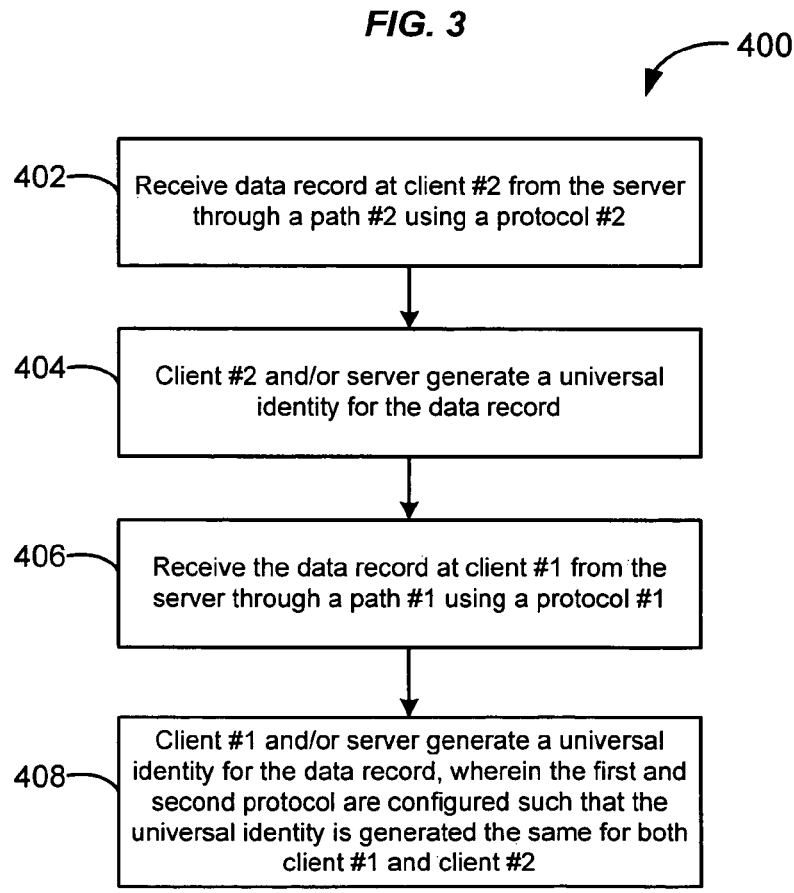
FIG. 4 depicts a simplified flowchart of a method for creating a universal identity according to one embodiment of the present invention.
Figure 5:
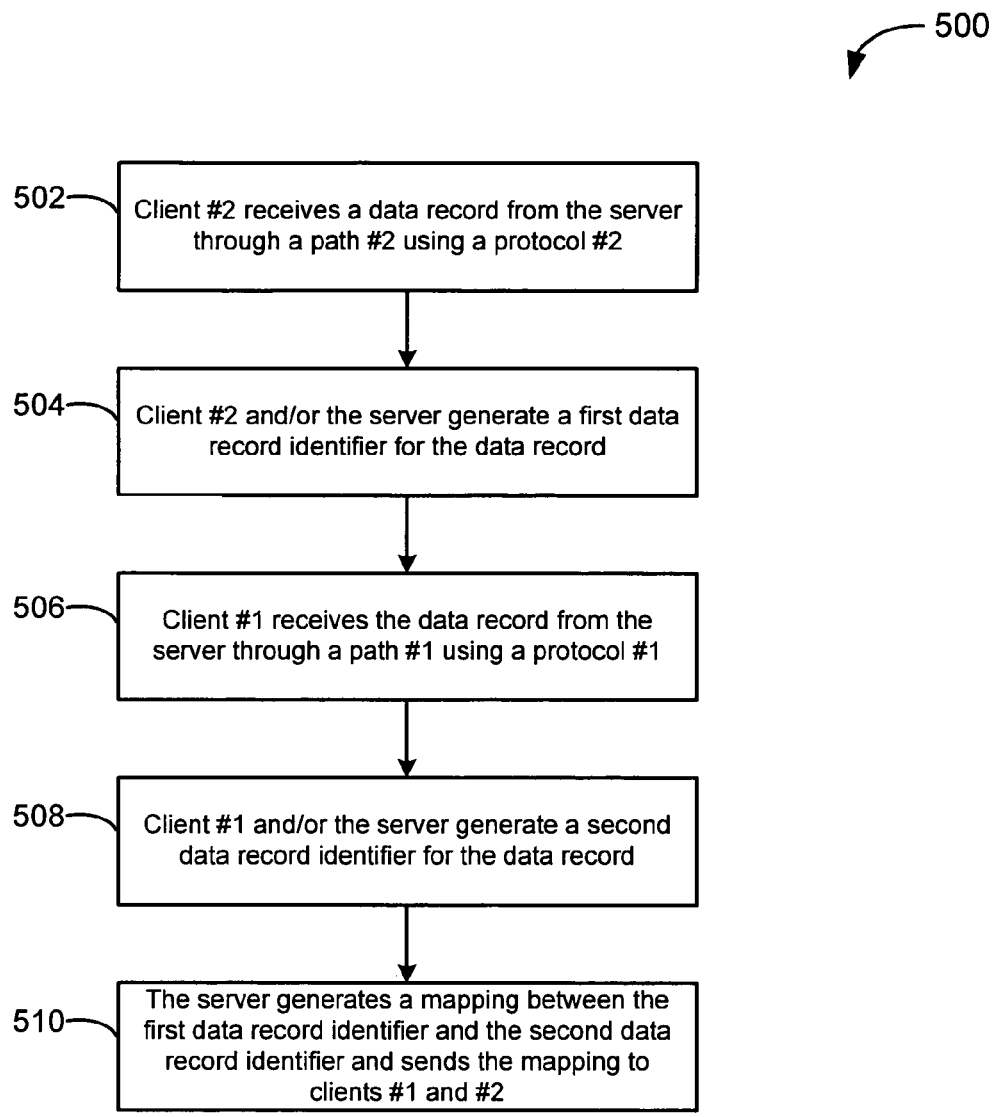
FIG. 5 depicts a simplified flowchart of a method for creating a mapping between data records created with different data record identifiers according to one embodiment of the present invention.

FIGS. 4 and 5 depict various scenarios for synchronization according to embodiments of the present invention. FIG. 4 depicts a simplified flowchart 400 of a method for creating a universal identity according to one embodiment of the present invention. In step 402, a data record is received at client 104-2 from server 102 through a second path using a second protocol. In step 404, client 104-2 and/or server 102 generate a universal identity for the data record.

In step 406, the data record is received at client 104-1 from server 102 through path #1 using protocol #1. Accordingly, the data record has been synchronized separately between server 102 and client 104-1 and server and client 104-2.

In step 408, client 104-1 and/or server 102 generate a universal identity for the data record. The universal identity is generated because protocol #1 and protocol #2 are configured such that the universal identity is generated the same for both client 104-1 and 104-2.

FIG. 5 depicts a simplified flowchart 500 of a method for creating a mapping between data records created with different data record identifiers according to one embodiment of the present invention. In step 502, client 104-2 receives a data record from server 102 through path #2 using a protocol #2.

In step 504, client 104-2 and/or server 102 generate a first data record identifier for the data record.

In step 506, client 104-1 receives the data record from server 102 through path #1 using protocol #1.

In step 508, client 104-1 and/or server 102 generate a second identifier for the data record. Protocol #1 and protocol #2 may be protocols in which identifiers for data records may be created differently depending on which client 104 is participating in the synchronization. For example, the client may be used to generate the data record identifiers thus making the identifiers different when different clients are used to synchronize with server 102.

In step 510, server 102 generates a mapping between the first data record identifier and the second data record identifier and sends the mapping to client 104-1 and client 104-2. The mapping may be stored in a field of the data record. For example, the mapping may be stored in a header of the data record.

EXAMPLES

The following describes examples according to embodiments of the present invention. When using the same protocol, such as IMAP, for protocols #1 and #2, and a different protocol, such as OMA DS for protocol #3, the following process may be used during synchronization according to one embodiment. A rule may be used to generate a universal identity using the DS protocol based on data record identifiers created using IMAP, and vice versa. The universal identity used by server 102 may be fixed. That is, the universal identities are stored at server 102 and are to be unchanged.

When using OMA DS for protocol #3 in the synchronization, clients 104-1 and 104-2. generate a universal identity based on the rule above. Both sides may have the same universal identity driven by the client in the synchronization and can synchronize as needed. Universal identities for new data records that are synchronized between clients 104-1 and 104-2 may be extracted and these records are sent to server 102. The IMAP identifiers are fixed at server 102. When synchronizing using DS, different data record identifiers may be generated for data record. However, a rule or algorithm may be used to generate the universal identity from the different data record identifiers for the OMA DS protocol and IMAP protocol. The universal identities are fixed at server 102 and when synchronization needs to be performed using protocol #3, the algorithm is used to translate identifiers.

Filter Considerations

If clients 104 filter information, then certain considerations may have to be made when synchronizing using a third path. This is because filters on different clients 104 may be different and thus different information may be filtered by clients 104. Thus, a client 104-1 may want certain data records but they may have been filtered by client 104-2 and thus are not synchronized with client 104-1.

If client 104-2 filters information (filter F1) that it receives from server 102 via protocol #2, some information may be filtered on client 104-2 that will be on server 102. For example, client 104-2 may filter information sent by a certain person, "Bob". Similarly, client 104-1 may filter information (filter F2) through protocol #1. For example, client 104-1 may filter information with the word "conflict" in them.

Assuming that client 104-1 synchronizes with client 104-2 through protocol #3, client 104-1 may have information F2 that is different from information F1. When using protocol #3, client 104-1 should be able to filter all the information from F2 to get only the subset that it would have received and not received based on the filters. For example, if filter F2 says all data records except ones with the word "conflict" are used, then all other data records found on server 102 should be synchronized with client 104-1. Thus, data records from "Bob" should be included in a synchronization with client 104-1. However, the data records from "Bob" were filtered by client 104-2 and are thus not synchronized to client 104-1.

In order to avoid the above, in one embodiment, client 104-2 should only have a subset of the filters that are found on client 104-1. Thus, client 104-1 is guaranteed to receive all the information from server 102 during a synchronization with client 104-2 that is desired. Then, client 104-1 can filter out the information during a synchronization with client 104-2.

In one example, client 104-2 may be a laptop and client 104-1 may be a mobile device. Because the mobile device may have a smaller storage capacity and/or viewing area, a user may desire less data records to be synchronized with the mobile device. Thus, filters may be set. However, a laptop may have full computing capabilities and may include a complete set of data records found on server 102. Thus, the mobile device knows that the filters are not set on the laptop and thus can freely filter information.

Client to Server Changes

When synchronizing between clients 104-1 and 104-2, the changes are propagated to server 102. Both clients 104-1 and 104-2 should not have to synchronize the changes with server 102 that were already synchronized, especially if these changes imply additional actions such as sending a data record. Thus, one client 104 synchronizes the changes to server 102. However, in one embodiment, a client 104-1 does not assume that changes it provides to another client 104-2 via a path #3 have been applied to server 102. In this case, client 104-1 maintains a list of changes that it wanted to apply and checks if they have been applied on server 102 when it synchronizes via path #1. Actions/changes (e.g. sending an email, etc.) that a client 104 requests server 102 to perform can also be stored as pseudo records with the universal identity (as any new records).

In one embodiment, the changes that client 104-1 desires are stored on client 104-1 until client 104-1 synchronizes with server 102 again. Client 104-1 or server 102 checks to see if the changes/actions were made. Also, different options may exist. Server 102 may maintain a list of changes received from client 104-2, client 104-1 sends the changes to server 102 and server 102 checks to see if all the changes were made. This process may also been performed by client 104-1. Also, server 102 may receive the changes from client 104-1 and may not apply the changes that have already been applied or that do not make sense, e.g., an email already sent, email already been moved, an email already deleted, etc.

In another embodiment, if a data record is sent/changed in a synchronization through path #3 with client 104-2, client 104-1 may want to make sure that the data record has been sent. Thus, in one embodiment, clients 104-1 do not make client changes until they are synchronized with the client and the server.

Servers 102 track new data records that are performed on behalf of client 104-1 when synchronized with client 104-2. The universal identity that is associated with data records for the new changes is checked to see if the action was taken. If actions have not been taken, the actions may then be taken by server 102. If they have been taken, then client 104-1 may delete the changes that have been saved.

Figure 6:
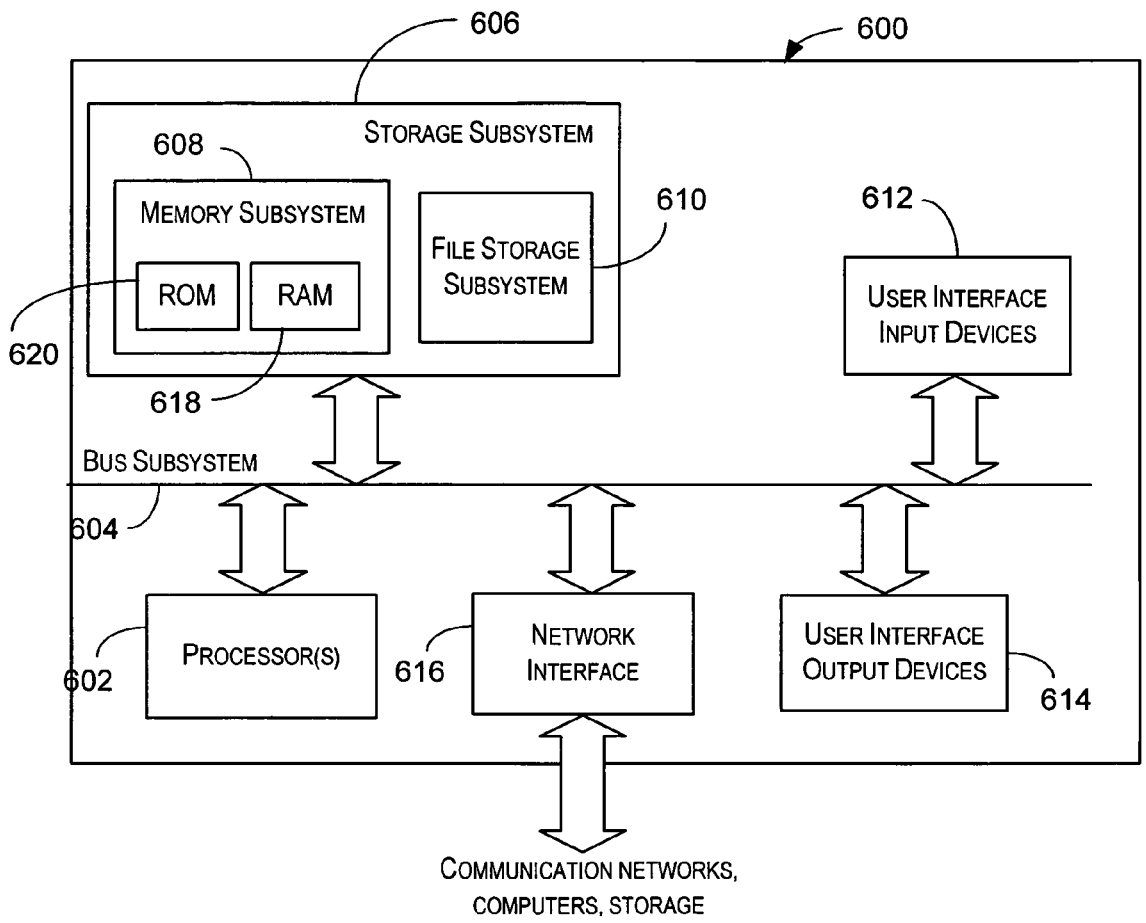
FIG. 6 is a simplified block diagram of data processing system that may be used to perform processing according to an embodiment of the present invention.

FIG. 6 is a simplified block diagram of data processing system 600 that may be used to perform processing according to an embodiment of the present invention. As shown in FIG. 6, data processing system 600 includes at least one processor 602, which communicates with a number of peripheral devices via a bus subsystem 604. These peripheral devices may include a storage subsystem 606, comprising a memory subsystem 608 and a file storage subsystem 610, user interface input devices 612, user interface output devices 614, and a network interface subsystem 616. The input and output devices allow user interaction with data processing system 602.

Network interface subsystem 616 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 616 serves as an interface for receiving data from other sources and for transmitting data to other sources from data processing system 600. Embodiments of network interface subsystem 616 include an Ethernet card, a modem (telephone, satellite, cable, ISDN, etc.), (asynchronous) digital subscriber line (DSL) units, and the like.

User interface input devices 612 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the termn "input device" is intended to include all possible types of devices and ways to input information to data processing system 600.

User interface output devices 614 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 600.

Storage subsystem 606 may be configured to store the basic programming and data constructs that provide the functionality of the present invention. For example, according to an embodiment of the present invention, software modules implementing the functionality of the present invention may be stored in storage subsystem 606. These software modules may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 604 provides a mechanism for letting the various components and subsystems of data processing system 602 communicate with each other as intended. Although bus subsystem 604 is shown schematically as a single bus, alternative embodiments of the bus subsystem may utilize multiple busses.

Data processing system 600 can be of varying types including a personal computer, a portable computer, a workstation, a network computer, a mainframe, a kiosk, or any other data processing system. Due to the ever-changing nature of computers and networks, the description of data processing system 600 depicted in FIG. 6 is intended only as a specific example for purposes of illustrating the preferred embodiment of the computer system. Many other configurations having more or fewer components than the system depicted in FIG. 6 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claim is:

1. A method for synchronizing data records between three or more processing devices through three or more paths, the method comprising:

synchronizing, from a first device with a first synchronization client, a first data record to a second device with a second synchronization client through a first path using a first communication protocol, wherein the first data record is assigned a data record identifier by the first device, wherein the first device assigns a stable common data record identifier based on the first protocol which allows stable common data record identifiers across clients, and wherein the data record identifier assigned to the first data record is also assigned as a first universal identity identifying the first data record;

synchronizing, from the first device, a second data record to a third device with a third synchronization client through a second path using a second communication protocol, wherein the second data record is assigned a second universal identity by the first device, wherein the first device does not assign a stable common data record identifier based on the second protocol which does not allow stable common data record identifiers across clients, wherein the second universal identity comprises a mapping of the second universal identity to the second data record, wherein the first device and the third device each store a mapping of the second universal identity to the second data record, and wherein the mapping is stored in the second data record; and synchronizing from the second device to the third device through a third path using a third communication protocol, wherein synchronizing comprises using the first universal identity and the mapping of the second universal identity to the second data record stored by the third device in the second data record to determine if the first data record and the second data record are the same data record based on comparing the first universal identity with the second universal identity and wherein at least one of the second communication protocol or the third communication protocol is different from the first communication protocol.

2. The method of claim 1, further comprising:
generating by the first device the first universal identity;
storing by the first device the first universal identity with the first data record;
generating by the first device the second universal identity; and
storing by the first device the second universal identity with the second data record.

3. The method of claim 1, wherein the first universal identity is the same as a first data record identifier and the second universal identity is the same as a second data record identifier.

4. The method of claim 3, wherein the first device generates the first universal identity and the second universal identity as being the same for the first and second data records when synchronizing with the second device and the third device.

5. The method of claim 1, wherein the universal identity is included as part of a first data record identifier for the first data record and as a part of a second data record identifier for the second data record.

6. The method of claim 1, wherein the first universal identity is used instead of a first data record identifier for the first communication protocol and the second universal identity is used instead of a second data record identifier for the second communication protocol.

7. The method of claim 1, wherein the first universal identity is based on a mapping between a first data record identifier and a second data record identifier, the data record identifier being different from the second data record identifier.

8. The method of claim 7, wherein the mapping is a rule that is used to generate the first universal identity from the first data record identifier and the second universal identity from the second data record identifier.

9. The method of claim 1, further comprising:
synchronizing a third data record from the second device to the third device through the third path using the third communication protocol, wherein the third data record is assigned a third universal identity by the second device;
synchronizing the third data record from the third device to the first device using the third universal identity and the second universal identity, wherein the second device does not have to re-synchronize the third data record with the first device after the third device and the first device synchronize.

10. The method of claim 9, wherein the first device keeps a record of the synchronization, the method further comprising:
checking by the first device that the third data record is synchronized between the third device and the first device.

11. The method of claim 1, wherein the first universal identity is the same as the second universal identity.

12. The method of claim 1, wherein the data record comprises an action or change to perform.

13. The method of claim 1, wherein the first device comprises a server, the second device comprises a client, and the third device comprises a client.

14. The method of claim 1, wherein synchronizing between at least two of the first, second, and third devices occurs at least partially during an offline state of one of the devices, wherein a repository of the offline device buffers at least one synchronization instruction until the offline device returns to an online state with respect to at least one other of the first, second, and third devices.

15. The method of claim 1, wherein at least one of the second synchronization client or the third synchronization client is different from the first synchronization client.

16. The method of claim 1, wherein both the second communication protocol and the third communication protocol are different from the first communication protocol and wherein the second communication protocol is different from the third communication protocol.

17. A system for synchronizing data between three or more processing devices through three or more paths, the system comprising:
- a first device executing a first synchronization client and configured to assign a data record identifier to a first data record;
- a second device executing a second synchronization client configured to synchronize the first data record with the first device through a first path and first communication protocol, wherein the first device assigns a stable common data record identifier based on the first protocol which allows stable common data record identifiers across clients, and wherein the data record identifier assigned to the first data record is also assigned as a first universal identity identifying the first data record; and
- a third device executing a third synchronization client configured to synchronize a second data record with the first device through a second path and second communication protocol, the second data record associated with a second universal identity, wherein the first device does not assign a stable common data record identifier based on the second protocol which does not allow stable common data record identifiers across clients, wherein the second universal identity comprises a mapping of the second universal identity to the second data record, the first device and the third device each configured to store in the second data record a mapping of the second data record to the second universal identity,
- wherein the second device and the third device are configured to synchronize stored data records through a third path and a third communication protocol, wherein the first universal identity and the mapping of the second universal identity to the second data record stored by the third device in the second data record are used to determine during the synchronization between the second device and the third device if the first data record is the same data record as the second data record and wherein at least one of the second communication protocol or the third communication protocol is different from the first communication protocol.

18. The system of claim 17, wherein the second device synchronizes a third data record between the second device and the third device through the third path using the third communication protocol, wherein the third data record is synchronized between the third device and the first device, wherein the second device does not have to re-synchronize the third data record with the first device after the third device and the first device synchronize.

19. The system of claim 18, wherein the first device keeps a record of the synchronization, wherein the first device checks that the third data record is synchronized between the second device and a server.

20. The system of claim 17, wherein the first device comprises a server and the second device and the third device comprise clients.

21. The system of claim 17, wherein the first universal identity is the same as the second universal identity.

22. The system of claim 17, wherein the universal identity is included as part of a first data record identifier for the first data record and as a part of a second data record identifier for the second data record.

23. The system of claim 17, wherein the first universal identity is used instead of a first data record identifier for the first communication protocol and the second universal identity is used instead of a second data record identifier for the second communication protocol.

24. The system of claim 17, wherein the data record comprises an action or change to perform.

25. The system of claim 17, wherein at least one of the second synchronization client or the third synchronization client is different from the first synchronization client.

* * * * *

UNITED STATES PATENT AND TRADEMARK OFFICE
CERTIFICATE OF CORRECTION

PATENT NO. : 8,589,340 B2  
APPLICATION NO. : 11/329862  
DATED : November 19, 2013  
INVENTOR(S) : Maes Page 1 of 1

It is certified that error appears in the above-identified patent and that said Letters Patent is hereby corrected as shown below:

In the Specification

In column 6, line 13, delete "record s" and insert -- records --, therefor.

In column 8, line 27, delete "104-2." and insert -- 104-2 --, therefor.

In column 10, line 23, delete "termn" and insert -- term --, therefor.

Signed and Sealed this  
Tenth Day of June, 2014

Michelle K. Lee  
*Deputy Director of the United States Patent and Trademark Office*